(12) United States Patent
Danze

(10) Patent No.: US 7,594,671 B2
(45) Date of Patent: Sep. 29, 2009

(54) NERF BAR STRUCTURE AND REPLACEABLE FOOT PEG INSERTS FOR UTILITY AND OFF ROAD VEHICLES

(76) Inventor: Alex Danze, 1678 N. Maple St., Corona, CA (US) 92880

( * ) Notice: Subject to any disclaimer, the term of this patent is extended or adjusted under 35 U.S.C. 154(b) by 486 days.

(21) Appl. No.: 11/499,312

(22) Filed: Aug. 7, 2006

(65) Prior Publication Data

US 2008/0029990 A1 Feb. 7, 2008

(51) Int. Cl.
*B60R 3/00* (2006.01)
(52) U.S. Cl. .......................... 280/163; 296/75
(58) Field of Classification Search ................ 280/163, 280/164.1, 291; 296/75
See application file for complete search history.

(56) References Cited

U.S. PATENT DOCUMENTS

| | | | | |
|---|---|---|---|---|
| 4,728,121 A * | 3/1988 | Graves | | 280/748 |
| 4,768,799 A * | 9/1988 | Millican | | 280/291 |
| 4,852,900 A * | 8/1989 | Nahachewski | | 280/291 |
| D389,440 S | 1/1998 | Walters et al. | | |
| D401,535 S | 11/1998 | Joseph, Jr. | | |
| 5,893,424 A * | 4/1999 | Hisada | | 180/90.6 |
| 6,017,045 A * | 1/2000 | Dermody | | 280/169 |
| 6,113,121 A * | 9/2000 | Mizuta | | 280/163 |
| 6,116,630 A * | 9/2000 | Thomas | | 280/291 |
| 6,224,134 B1* | 5/2001 | Johnson et al. | | 296/75 |
| 6,270,106 B1* | 8/2001 | Maki et al. | | 280/291 |
| 6,502,863 B1* | 1/2003 | Takahashi et al. | | 280/847 |
| 6,659,566 B2* | 12/2003 | Bombardier | | 298/22 R |
| 6,682,085 B2* | 1/2004 | Furuhashi et al. | | 280/163 |
| D488,407 S * | 4/2004 | Wright | | D12/125 |
| D489,295 S | 5/2004 | Wright | | |
| 6,755,269 B1* | 6/2004 | Davis et al. | | 180/89.1 |
| 6,968,917 B2* | 11/2005 | Rondeau et al. | | 180/89.1 |
| 7,121,371 B2* | 10/2006 | Rondeau et al. | | 180/89.1 |
| 7,258,192 B2* | 8/2007 | Davis et al. | | 180/312 |
| 7,404,568 B1* | 7/2008 | Portelance et al. | | 280/291 |
| 7,506,714 B2* | 3/2009 | Davis et al. | | 180/89.1 |
| 2004/0206568 A1* | 10/2004 | Davis et al. | | 180/311 |
| 2005/0121876 A1* | 6/2005 | Gaudreau et al. | | 280/169 |
| 2007/0295546 A1* | 12/2007 | Maltais et al. | | 180/215 |
| 2008/0029990 A1* | 2/2008 | Danze | | 280/163 |
| 2008/0030040 A1* | 2/2008 | Danze | | 296/75 |
| 2008/0217081 A1* | 9/2008 | Maltais et al. | | 180/89.1 |
| 2008/0217088 A1* | 9/2008 | Berg | | 180/233 |
| 2008/0246300 A1* | 10/2008 | Portelance et al. | | 296/75 |

* cited by examiner

*Primary Examiner*—Jeffrey J Restifo
(74) *Attorney, Agent, or Firm*—Kirk A. Buhler; Buhler & Associates

(57) ABSTRACT

A foot rest and foot holding apparatus is disclosed that protects a users foot from ground obstructions. The foot holding apparatus has multiple friction points to reduce movement of a foot in the apparatus. The structure includes serrated inserts that grip the bottom of a shoe to maintain the foot in position. The inserts are replaceable or changeable to accommodate foot placement preference. The foot peg inserts have a serrated top structure for gripping the underside of a shoe and have an inner and an outer component that can be used individually or in combination. The nerf structure is a combination fabric and welded metal brush guard where the foot pegs are mounted.

10 Claims, 3 Drawing Sheets

NERF BAR STRUCTURE AND REPLACEABLE FOOT PEG INSERTS FOR UTILITY AND OFF ROAD VEHICLES

FIELD OF THE INVENTION

This invention relates to a foot rest platform and replaceable foot peg inserts. More particularly, the present invention is a structure used in combination with three or four wheeled vehicles where a user can rest their foot without the foot contacting the ground or brush. The structure includes serrated inserts that grip the bottom of a shoe to maintain the foot in position. One or more of the inserts are replaceable.

BACKGROUND OF THE INVENTION

The use and popularity of three and four wheeled personal vehicles has expanded from utility products such as lawn mowers or tractors to a separate industry that allows recreational users to take versions of the vehicles off road to explore areas that would be difficult strenuous of require an extended time of travel. In the expansion of this segment of all terrain vehicles the need to accommodate safety and comfort of the user is preferred. One common area that makes use of the vehicle more comfortable is the placement of the user's feet. In general the foot is placed on a nerf rail or guard that keeps the foot elevated above rocks brush or other obstructions that the vehicle is riding over. As the user rides over uneven surfaces the user's feet can bounce around making it difficult to maintain foot position. Several patents have been issued to provide a place for the foot to rest and other patents have been issued that provide a frictional surface that reduces movement of the foot as the vehicle moves and often bounces over the terrain.

U.S. Pat. No. 4,728,121 issue to Graves on Mar. 1, 1988 discloses a foot protector constructed from tubular metal members. While the disclosed foot protector provides the basic function of protecting the users feet from ground obstructions, it is constructed only from tubular material and not a combination of tubular material and sheet material nor does it provide for attachment of a fabric webbing to extend the foot protection area. In addition the Graves patent does not provide for a heel basin or a configurable foot peg.

U.S. Pat. No. 4,451,057 issue to Lawson on May 29, 1984 discloses a foot rest made from sheet metal that has been bent and formed to create a foot rest for a front and back passenger. The bent sheet metal foot rest provides a substantially flat surface without a gripping portion to help maintain the user's foot in position of the foot rest. The entire foot rest area is made from a single sheet and does not provide for a fabric webbing to extend from the foot protection area. Tubular members are only used to connect the foot rest onto the motorcycle and are not user in the overall shape of the foot rest.

U.S. Pat. No. 6,270,106 issue to Maki et al. on Aug. 7, 2001 discloses a foot platform constructed from sheet metal that has been bent to form integrated rough areas to reduce the potential for foot movement. The bent sheet metal foot rest provides a substantially flat surface that has been formed with texture that covers the majority of the foot rest area to help maintain the user's foot in position in the foot rest but the area is not configurable with a changeable foot peg. The entire foot rest area is made from a single sheet and does not provide for a fabric webbing to extend the foot protection area.

U.S. Pat. No. D401,535 issued to Joseph, Jr. on Nov. 24, 1998, D488,407 issued to Wright on Apr. 13, 2004 and D489,295 issued to Wright on May 4, 2004 each disclose a foot peg for a motorcycle, or all terrain vehicle. Each of these patents discloses a foot peg that is bolted to an existing frame structure and then extends outside of the frame structure. These two foot pegs are fabricated from a single block of material and are designed for bolting onto and existing frame structure. They are not configurable or changeable to accommodate user preferences.

What is needed is a foot rest for an off read vehicle fabricated from a combination of tubular and sheet metal components to provide both structure, styling and safety to the user. The ideal product would also provide for a fabric web to extend the protection area. Configurable foot pegs would also provide additional benefit to accommodate user preferences. The proposed structure and foot peg provides these functions giving foot protection with configurability.

BRIEF SUMMARY OF THE INVENTION

It is an object of the nerf bar structure and foot peg insert to provide a nerf bar structure having an outer tubular frame that is mountable onto the frame of a two to four wheeled recreational or off road vehicle. The mounting components allow for a universal mounting that can be attached to a variety of different vehicles or the mounting and configuration of the structure can be custom made to only attach to a specific vehicle made by one manufacturer.

It is an object of the nerf bar structure and foot peg insert to provide a nerf bar structure having a formed and welded sheet metal basin or well for the protection of a user's foot as well as providing a rest location to support the foot when using the recreation or off road vehicle. The basin or well starts as a flat sheet of material. It is the punched and formed and bent to accommodate a preferred structure providing the pocketed basin for a foot rest and side walls that provide structural strength and protection from brush rocks and other ground debris.

It is another object of the nerf bar structure and foot peg insert to provide a configurable foot peg insert. The configurable foot peg insert comprises of an inner and an outer component that can be used individually or in combination to provide improved foot position holding. The foot peg inserts include multiple rigid mounting holes for mounting onto the nerf bar. The top of the foot pegs are configured with raised features to grip the underside of a boot or shoe.

It is another object of the nerf bar structure and foot peg insert to provide a nerf bar structure with a combination of holes and slots that provide holding locations for a foot as well as styling details. The structure of the nerf bars provides improved structural strength to the vehicle and is sufficiently strong enough to allow a user to stand on the structure to look above obstructions in front of them.

It is another object of the nerf bar structure and foot peg insert to provide a nerf bar structure with tubular components that operate in combination with sheet metal components to provide an overall structure for mounting onto a vehicle. The tubular members are easily configurable to accommodate minor physical variations between different vehicle frames.

It is still another object of the nerf bar structure and foot peg insert to provide a nerf bar structure with features that allow the attachment of a fabric web. The fabric web allows for a larger foot protection area and allows for air movement around the nerf structure. The webbing further provides the benefit of improved viewing the area around and under the vehicle.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
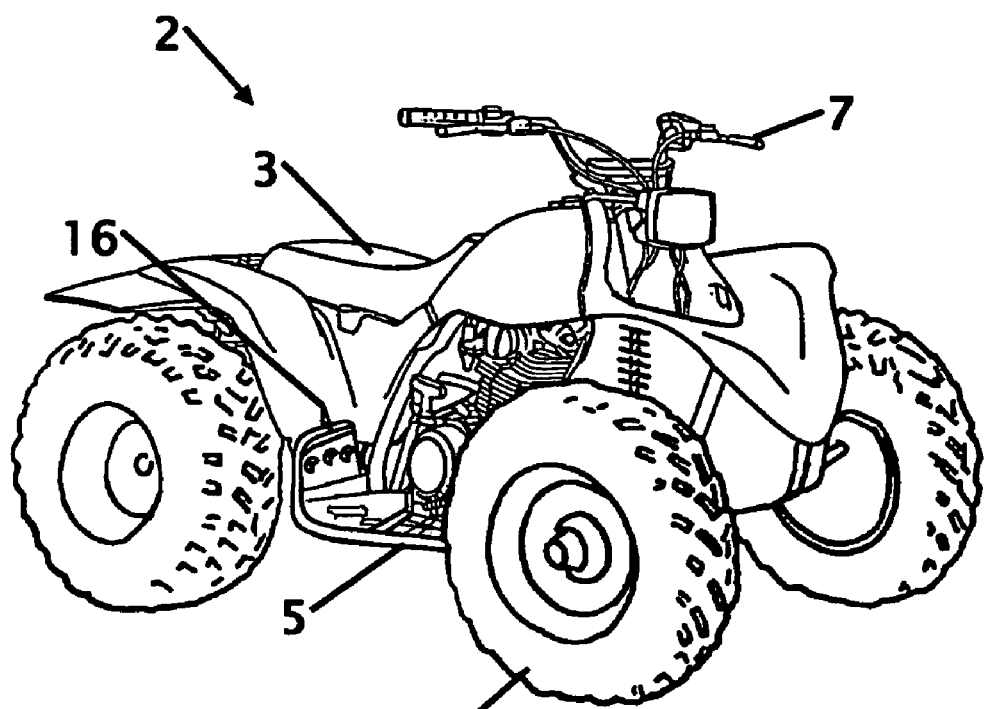
FIG. 1 shows an isometric view of a four wheeled all terrain vehicle with the nerf bar structure and the replaceable foot peg inserts.

FIG. 1 shows an isometric view of a four wheeled all terrain vehicle with the nerf bar structure and the replaceable foot peg inserts. The four wheeled vehicle 2 is shown as an example of vehicles the structure is mounted onto. While this figure shows a four wheeled vehicle the vehicle could have as few as two wheels, or more than four wheels and utilizing handlebars 7 for steering the vehicle. In the preferred embodiment, the vehicle has three or four wheels. The vehicle shown I typically referred to as a Quad but is also referred to as an all terrain vehicle (ATV), multi-wheeled recreation vehicle and other names. Vehicles of this type are used for utility, as on a farm, and are used off road for personal or group exploration. The wheels 6 are often configured based upon the area the user will be riding upon. The user sits on top of the seat 3 and straddles the motor placing their feet onto the foot rest, or nerf bar. The nerf bar is defined here as a textured bar, rail, tube, member or other structure that supports the foot of a user and may include texture that helps to maintain the foot in location. The nerf bar structure 5 attaches 16 to the frame, fenders or other location on the vehicle with fasteners such as screws, bolts or other similar hardware.

In one contemplated embodiment the nerf bar is configured with adjustable member and has slots or multiple holes to allow the nerf bar to attach a variety of different vehicles. In the preferred embodiment the nerf bar is specifically designed for a specific vehicle and utilizes existing attachment location to secure the nerf bar onto the vehicle. Attachment of the nerf bar onto the vehicle must be sufficiently secure to allow for a user standing on the nerf bar and the nerf bar coming in contact with rocks or other ground debris that is present in off road usage. The structural rigidity of the nerf bar is also important to provide protection to the feet and legs of the user as they ride the vehicle. The preferred embodiment of the nerf bar is shown and described in FIG. 2.

Figure 2:
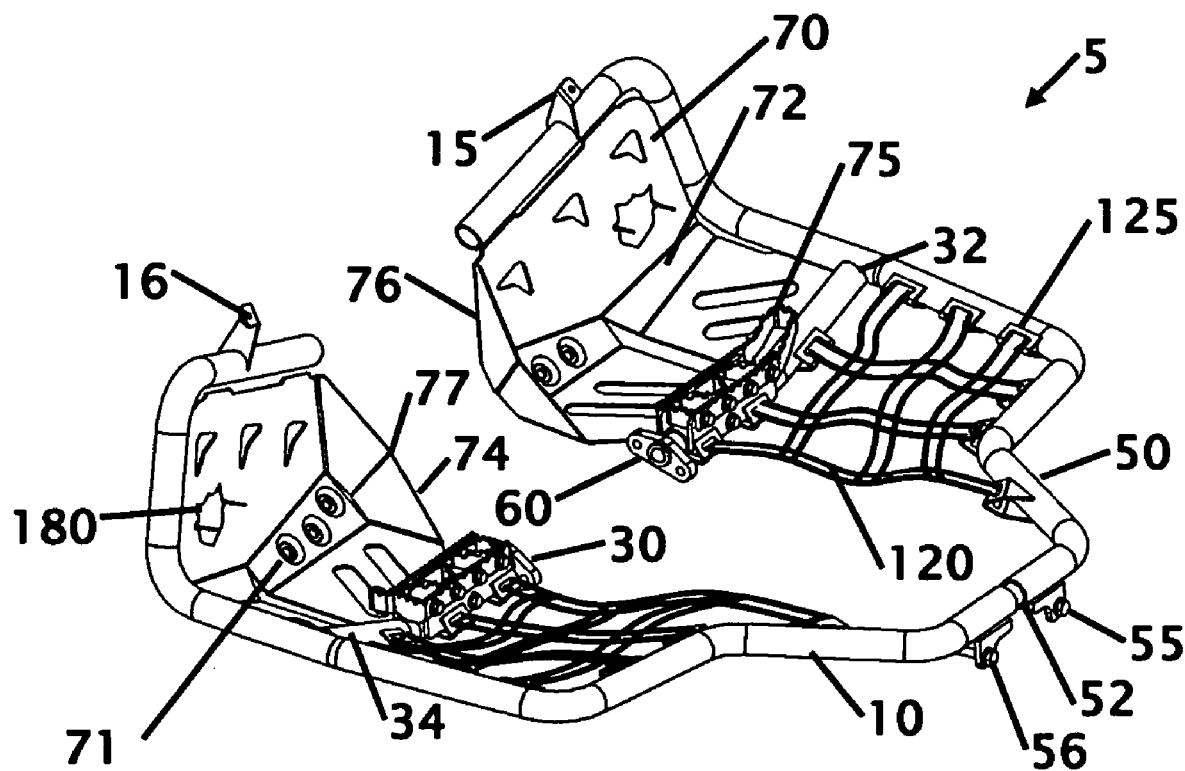
FIG. 2 is a detailed isometric view of the nerf bar structure and the replaceable foot peg inserts.

FIG. 2 is a detailed isometric view of the nerf bar structure 5 and the replaceable foot peg inserts. In this view the nerf bar includes a tubular member that wraps substantially around the nerf bar. The shape of the nerf bar is essentially a mirror image when viewed down the center of the structure. The two halves attach independently to the frame from each side and secure in the center 52 under the vehicle. Mounting hardware 55 and 56 secure the nerf rail to the front of the vehicle. This hardware mounts either through existing holes in the frame of the vehicle, or the owner of the vehicle can drill holes through an existing part of the vehicle for mounting. In the preferred embodiment the nerf bar structure mounts to the "A" frame suspension of the vehicle 2. In most cases the mounting location utilizes holes where a fender or cosmetic component is attached. From attachment point 55 or 56 the tubular frame bends around the front of the vehicle such that it does not restrict movement of the steering mechanism. The tubes 10 and 50 provide the structural support from the front of the nerf bar to the location where a user places their feet.

Tubular members 10 and 50 have a number of "V" shaped members 125 welded onto the tubes. These "V" shaped members have elongated slots that allow flexible straps 120 to be threaded or otherwise attached to the tubes. As shown in this figure the. straps create a web that allows for limited protection from brush that passes under the vehicle as well as allows the user to view the area they are traversing. Tubes 32 and 34 create a support for the fabric web as well as providing a rigid structural support for connection to the frame of the vehicle at locations 30 and 60. The tube members wrap around formed sheet metal members 70 that provide a foot well for the user where they would normally place the heel of their foot in location 71 and the toe of their foot on the foot pegs 75. The foot pegs will be described in more detail in FIGS. 5-8. The foot well provides protection from rocks or other debris that can be thrown up from the wheels as well as provide protection from rocks or other anomalies that can exist off road.

The sheet metal basin is formed from sheet metal and triangular or pie shaped sections are removed and the edges from the removed section are joined and welded at 77 to form two structural triangles 74 and 76 to increase the structural strength of the basin or foot well. The foot well incorporates a variety of features such as slots, grooves, raise, and depressed areas to allow drainage, cleaning and improve foot retention. The foot well starts as a flat punched and formed sheet. The sheet is fit and welded onto the tubular frame to create a single structural unit, or half unit that is bolted to the frame of the vehicle. Additional mounting locations 15 and 16 secure the back of the nerf bar on the frame of the vehicle. A location for a logo plate 180 provides a mounting location to identify the part number or other identifiable information regarding the manufacturer.

Figure 3:
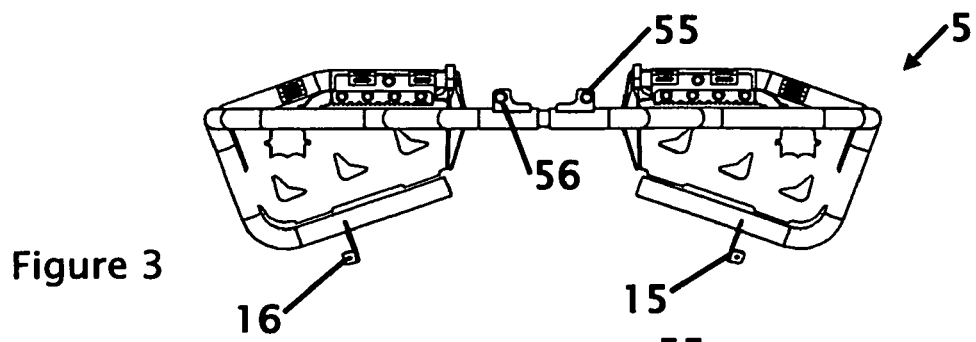
FIG. 3 is a front view of the nerf bar structure and the replaceable foot peg inserts.

FIG. 3 is a front view of the nerf bar structure and the replaceable foot peg inserts. This view show the structure 5 looking across the front frame mounts. Attachment ears 15 and 16 are shown that mount in the rear of the vehicle. Front mounting hardware locations 55 and 56 are shown.

Figure 4:
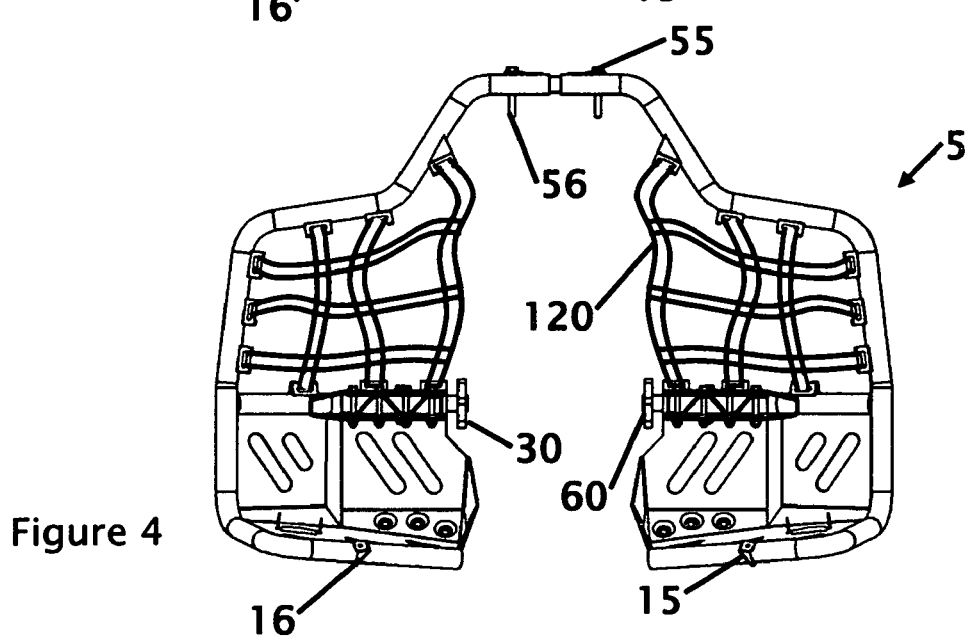
FIG. 4 is a top view of the nerf bar structure and the replaceable foot peg inserts.

FIG. 4 is a top view of the nerf bar structure 5 and the replaceable foot peg inserts. The flexible web netting 120 is visible in this view stretching across and around the tubular structure. Foot peg weldments 30 and 60 are shown in the middle of the structure. Attachment ears 15 and 16 are shown that mount in the rear of the vehicle. Front mounting hardware locations 55 and 56 are shown.

Figure 5:
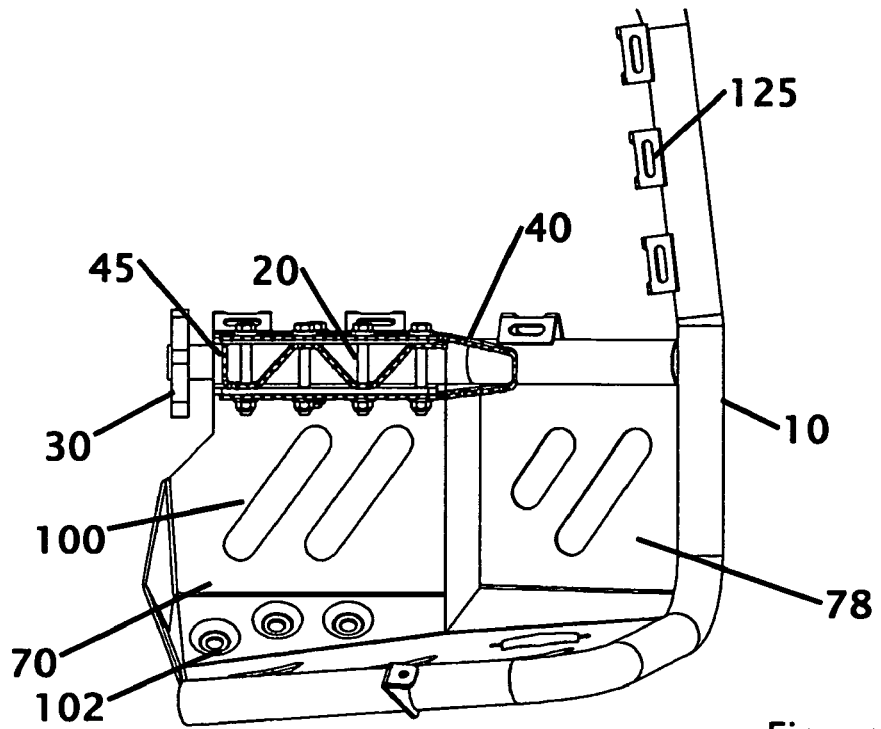
FIG. 5 is a detailed top view of the nerf bar structure showing the replaceable foot peg inserts.

FIG. 5 is a detailed top view of the nerf bar structure showing the replaceable foot peg inserts. This figure shows only the rear section of the right side 10 of the nerf bar. The foot well incorporates a variety of features such as slots 100, grooves, raise, and depressed areas 102 to allow drainage, cleaning and improve foot retention. Tubular member 10 has a number of "V" shaped members 125 welded onto the tubes. These "V" shaped members have elongated slots that allow flexible straps to be threaded or otherwise attached to the tubes. Foot peg weldment 30 is shown in the middle of the structure. The tube members wrap around formed sheet metal member 70 that provide a foot well for the user where they would normally place the heel of their foot in location 70 and the toe of their foot on the foot pegs 40 and 45. The heel well is configured with an inside area 70 and an outside area 78 that allows for a second person to ride the vehicle in tandem where they the rear rider can place their feet outside of the front rider in foot well location 78. The foot pegs 40 and 45 are shown and described in more detain in FIGS. 6-8. The foot pegs are held in location on the nerf bar using hardware 20 that passes though the foot pegs securing them to the nerf bar.

Figure 6:
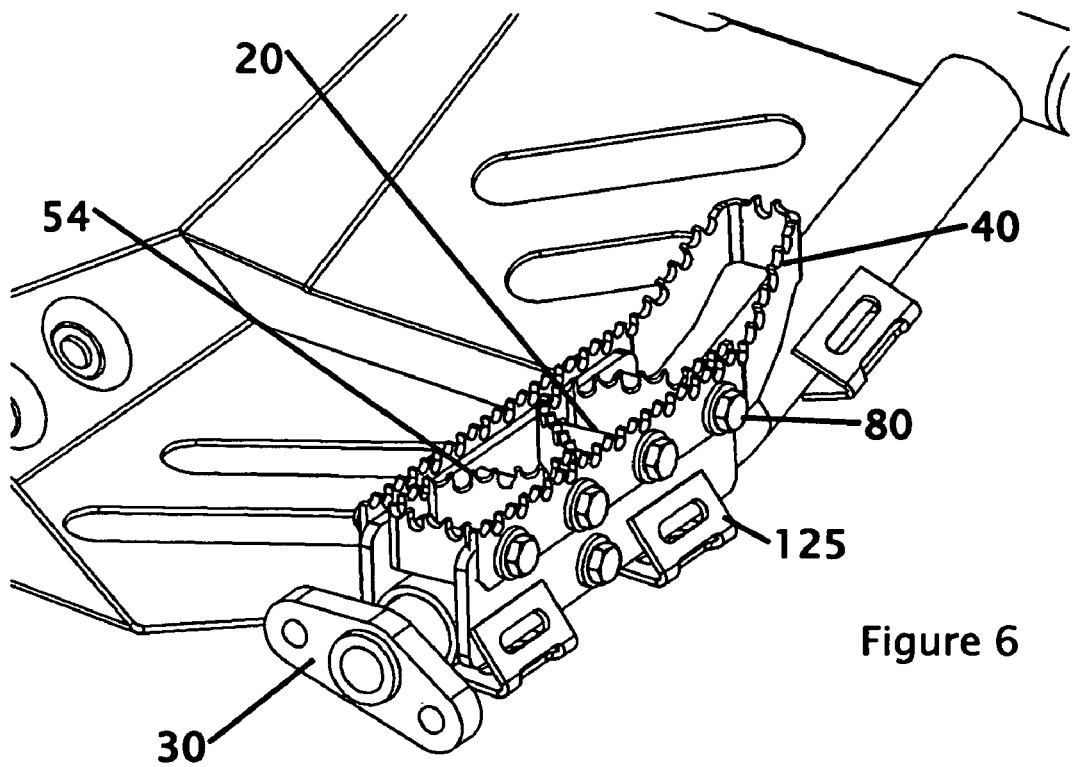
FIG. 6 is a detailed isometric view of the nerf bar structure and the replaceable foot peg inserts.

FIG. 6 is a detailed isometric view of the nerf bar structure and the replaceable foot peg inserts. The foot peg weldment 30 attaches to the frame of the vehicle to provide a rigid mounting location for the nerf bar that is sufficient to support the weight of a user if they stand-up on the nerf bar or foot pegs. The foot pegs in the embodiment shown use an inner foot peg member 45 and an outer foot peg member 40. These members are replaceable and can be used independently form each other. Inner foot peg 45 is shown and described in detail in FIG. 8, and outer foot peg 40 is shown and described in detail in FIG. 7. While only an inner and outer replaceable foot peg is shown where each can be independently installed or replace, it is contemplated that other embodiments and shapes can be used including multiple inserts of various configurations that can be nested to accommodate user preference. The foot pegs are held in location on the nerf bar using hardware 20 that passes though the foot pegs securing them to the nerf bar. The mounting hardware consists of a threaded fattener such as a bolt 80 but other similar securing hardware is contemplated that provides equivalent function. The tubular member has a number of "V" shaped members 125 welded onto the tubes. These "V" shaped members have elongated shots that allow flexible straps to be threaded or otherwise attached to the "V" shaped members 125.

Figure 7:
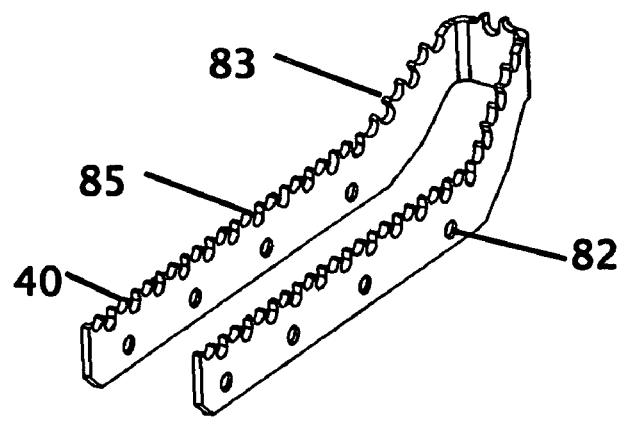
FIG. 7 is a detailed view of the outside foot peg insert shown in FIGS. 2-6.

FIG. 7 is a detailed view of the outside foot peg insert shown in FIGS. 2-6. Outer foot peg 40 is formed from flat sheet metal into a "U" shaped configuration. The formed foot peg has at least one flat edge and at least one serrated edge and holes 82 placed horizontally through the thin sides of the flat metal for mounting the insert on a nerf bar. The foot peg insert is treated and or coated with wear and or environmental coating. In the formed shape a straight area 85 and a raised area 83 exists. The raised area helps to keep a foot inward and push it into the center of the vehicle, thus reducing the possibility that the foot will extend outside of the nerf bar structure.

Figure 8:
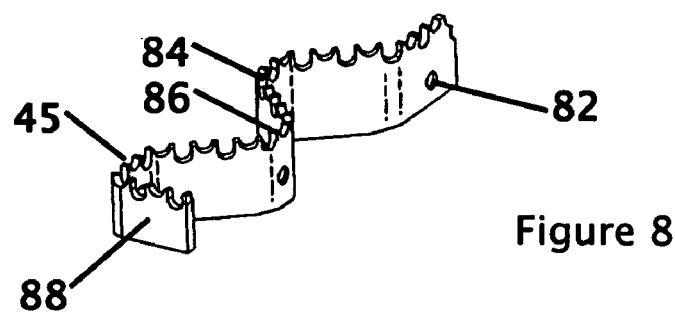
FIG. 8 is a detailed view of the inside foot peg insert shown in FIGS. 2-6.

FIG. 8 is a detailed view of the inside foot peg insert shown in FIGS. 2-6. The inner foot peg 45 is formed from flat sheet metal into an "S" shaped configuration. The formed foot peg has at least one flat edge and at least one serrated edge and holes 82 placed horizontally through the thin sides of the flat metal for mounting the insert on a nerf bar. The foot peg insert is treated and or coated with wear and or environmental coating. In the formed "S" shape crosses the area between the outer foot pegs to improve foot retention on the foot peg. The shape bends from one side of the outer foot (when installed inside the outer foot peg) peg 84 to the other side 86 of the outer foot peg. A front closure bend 88 closes the end of the inner foot peg.

Thus, specific embodiments of a nerf bar structure and foot peg insert structure have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A nerf bar structure for a vehicle comprising:
   a combination tubular and sheet metal frame structure that mounts to a personal transportation vehicle where the structure includes;
   a tubular outer nerf frame that wraps at least partially around a formed sheet metal basin and further creates a heel or foot guard;
   that further includes at least two fabric attachment components for attaching fabric webbing to the tubular structure in which the at least two fabric attachment components are "V" shaped and provide at least one slot for attachment of the at least one fabric web, and
   a formed sheet metal basin that provides at least some protection from ground debris as well as foot rest support.

2. The nerf bar structure for a vehicle according to claim 1 in which the tubular outer frame includes mounting hardware for attachment onto the vehicle.

3. The nerf bar structure for a vehicle according to claim 1 in which the formed sheet metal basin is attached to the tubular frame and further includes a raised back component for support of a user's heel.

4. The nerf bar structure for a vehicle according to claim 1 that further includes attachment locations for securing at least one foot insert.

5. The nerf bar structure for a vehicle according to claim 1 in which the structure is fabricated from two mirror image halves that attach to the vehicle from opposing sides to the vehicle.

6. A nerf bar structure for a vehicle comprising:
   a tubular nerf bar and sheet metal frame structure that mounts to the suspension "A" arm of a personal transporttation vehicle and the sheet metal frame structure is formed and folded to increase the structural strength of the frame structure that further includes at least two fabric attachment components for attaching fabric webbing to the tubular structure in which the at least two fabric attachment comronents are "V" shaped and provide at least one slot for attachment of the at least one fabric web.

7. The nerf bar structure for a vehicle according to claim 6 wherein a portion of the sheet metal frame is folded and welded to form triangular structural sections.

8. The nerf bar structure for a vehicle according to claim 6 wherein the heel guard formed from folded metal.

9. The nerf bar structure for a vehicle according to claim 6 that further includes attachment locations for securing at least one foot insert.

10. The nerf bar structure for a vehicle according to claim 6 in which the structure is fabricated from two mirror image halves that attach to the vehicle from opposing sides to the vehicle.

* * * * *